US010796361B2

(12) United States Patent
Puthiyottil et al.

(10) Patent No.: US 10,796,361 B2
(45) Date of Patent: Oct. 6, 2020

(54) AUCTION BASED DECENTRALIZED TICKET ALLOTMENT

(71) Applicant: BMC Software, Inc., Houston, TX (US)

(72) Inventors: Vineesh Puthiyottil, Kerala (IN); Sameer Kulkarni, Bangalore (IN)

(73) Assignee: BMC Software, Inc., Houston, TX (US)

( * ) Notice: Subject to any disclaimer, the term of this patent is extended or adjusted under 35 U.S.C. 154(b) by 559 days.

(21) Appl. No.: 13/930,466

(22) Filed: Jun. 28, 2013

(65) Prior Publication Data
US 2014/0278600 A1 Sep. 18, 2014

Related U.S. Application Data

(60) Provisional application No. 61/800,754, filed on Mar. 15, 2013.

(51) Int. Cl.
G06Q 30/08 (2012.01)
G06Q 30/00 (2012.01)
G06Q 10/06 (2012.01)

(52) U.S. Cl.
CPC ..... *G06Q 30/08* (2013.01); *G06Q 10/063114* (2013.01); *G06Q 30/016* (2013.01)

(58) Field of Classification Search
CPC .............. G06Q 10/06; G06Q 10/0631; G06Q 10/06311; G06Q 10/063114; G06Q 30/016; G06Q 30/08
See application file for complete search history.

(56) References Cited

U.S. PATENT DOCUMENTS

| 10,621,517 | B2* | 4/2020 | Deshpande | G06Q 10/06 |
| 2004/0114571 | A1* | 6/2004 | Timmins | H04L 12/66 370/352 |
| 2005/0071241 | A1* | 3/2005 | Flockhart | G06Q 30/0601 705/26.1 |
| 2005/0183109 | A1* | 8/2005 | Basson | G06Q 30/0601 725/4 |
| 2007/0223671 | A1* | 9/2007 | Lee | G06Q 10/06 379/201.01 |
| 2007/0244800 | A1* | 10/2007 | Lee | G06Q 10/06 705/37 |
| 2009/0006160 | A1* | 1/2009 | Boegner | G06Q 10/06 705/7.16 |

(Continued)

OTHER PUBLICATIONS

Ross, Terry and Soland Richard, 1975, A Branch and Bound Algorithm for the Generalized Assignment Problem, Mathematical Programming, North-Holland Publishing Company, pp. 91-103.*

(Continued)

*Primary Examiner* — Matthew S Gart
*Assistant Examiner* — Stephen S Swartz
(74) *Attorney, Agent, or Firm* — Brake Hughes Bellermann LLP

(57) ABSTRACT

Described is a method for auction based decentralized ticket allotment. The method includes receiving a ticket indicating a system problem, generating an auction for the ticket, receiving at least one bid, based on the auction, to resolve the system problem from at least one agent, the at least one bid including one of a time to resolution, a hold and a no bid, and allotting the ticket to an agent based on the at least one bid.

20 Claims, 7 Drawing Sheets

(56) References Cited

U.S. PATENT DOCUMENTS

| | | | |
|---|---|---|---|
| 2011/0066556 A1* | 3/2011 | Kadosh | G06Q 10/06 |
| | | | 705/80 |
| 2011/0320230 A1* | 12/2011 | Podgurny | G06Q 10/06 |
| | | | 705/7.13 |
| 2014/0278600 A1* | 9/2014 | Puthiyottil | G06Q 30/08 |
| | | | 705/5 |

OTHER PUBLICATIONS

Deshpande, Prasad M. et al, "Auction Based Models for Ticket Allocation Problem in IT Service Delivery Industry", IEEE International Conference on Services Computing, 2008, 8 pages.

* cited by examiner

AUCTION BASED DECENTRALIZED TICKET ALLOTMENT

This application claims the benefit of U.S. Provisional Patent Application 61/800,754 filed on Mar. 15, 2013 entitled auction based decentralized ticket allotment, the entire contents of which are incorporated herein by reference.

FIELD

Embodiments relate to trouble ticket assignment.

BACKGROUND

In conventional ticket (e.g., trouble ticket) assignment models tickets get incorrectly assigned or, at best, do not get assigned to the most capable person to solve the problem. Typically, a task is pushed on an agent (e.g., a technician) to some type of work. In other words, a ticket is typically assigned to an agent where assignment generally implies the agent has been given a task whether agent wants the task or not. Contrast assignment to allotment where allotment emphasizes the point that a task has been set aside and someone will be granted the privilege to work on the task. Further, in conventional ticket assignment models collaboration between agents is traditionally adhoc. Collaboration can be a formal process. However, the formal process depends on the initiative of the agent assigned to the task.

The known ticket assignment models do not allow for efficient decentralized ticket allotment based on an agent's skillsets. Thus, there is a need for an efficient decentralized ticket allotment system based on an agent's skillsets.

SUMMARY

One embodiment includes a method for auction based decentralized ticket allotment. The method includes receiving a ticket indicating a system problem, generating an auction for the ticket, receiving at least one bid, based on the auction, to resolve the system problem from at least one agent, the at least one bid including one of a time to resolution, a hold and a no bid, and allotting the ticket to an agent based on the at least one bid.

Another embodiment includes a non-transitory computer readable medium including code segments that when executed by a processor cause the processor to receive a ticket indicating a system problem, generate an auction for the ticket, receive at least one bid, based on the auction, to resolve the system problem from at least one agent, the at least one bid including one of a time to resolution, a hold and a no bid, and allot the ticket to an agent based on the at least one bid.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
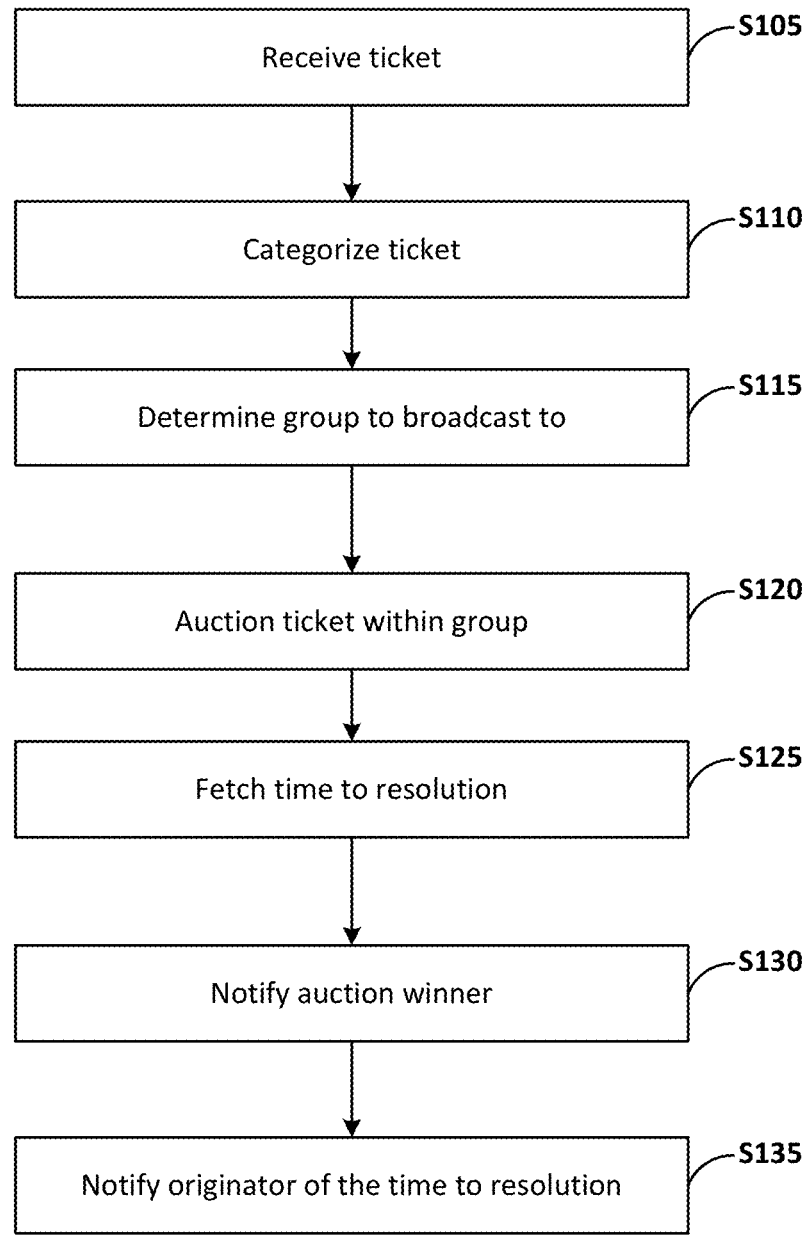
FIG. 1 illustrates a method for allotting a trouble ticket according to at least one example embodiment.

It should be noted that these Figures are intended to illustrate the general characteristics of methods, and/or structure utilized in certain example embodiments and to supplement the written description provided below. These drawings are not, however, to scale and may not precisely reflect the precise structural or performance characteristics of any given embodiment.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

According to example embodiments, auctioning may be added to the process of allotting tickets to an agent. Auctioning may provide reward based proactive participation, leveraging experience along with skill to tap into tribal knowledge (e.g., expands granularity of skill to include first-hand undocumented experience). Further, according to example embodiments, past performance may continuously factors into a current auction bidding process. In other words, a built in feedback loop may be factored into the auction process. Past performance may be utilized to determine how accurate a previous bid was accomplished (e.g., measure performance of an agent for performing a previously "won" bid). In addition, an auction process may take into consideration a current weighted queue, input from traditional systems, and prioritization based on priority coefficient which considers a scale factor that is computed based on severity and impact.

According to Example embodiments, ticket assignment may introduce an auction mechanism to the ticketing process. The auctioning mechanism may reward proactive participation, allow collaboration on compound tickets, support input from traditional systems, leverage experience along with skill to tap into tribal knowledge, handle race conditions, factor past performance, provide priority evolution and staleness factor, and provide a conditional auto-decline.

Figure 6:
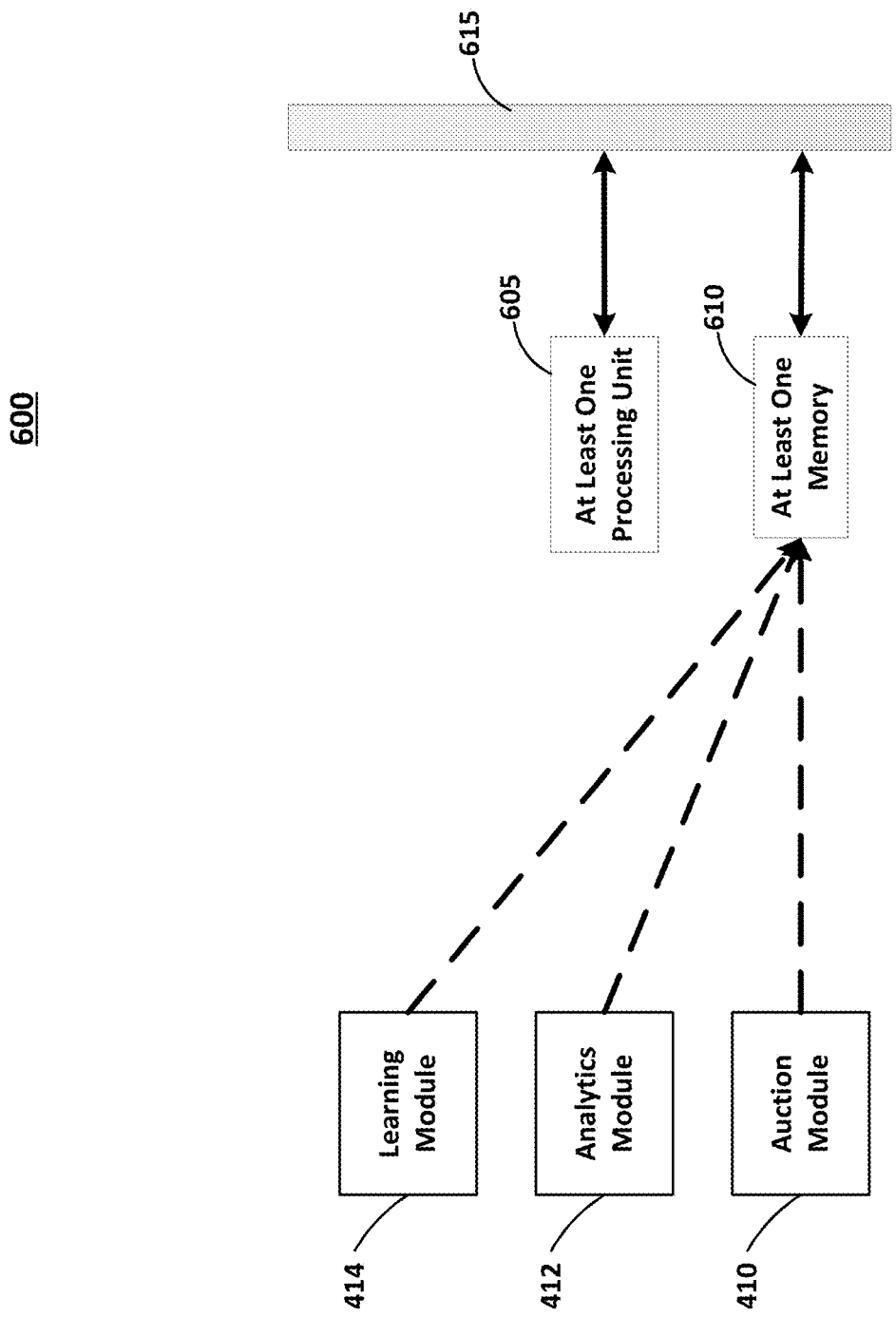
FIG. 6 illustrates an apparatus according to at least one example embodiment.

FIG. 1 illustrates a method for allotting a trouble ticket according to at least one example embodiment. The method steps described with regard to FIG. 1 may be executed as software code stored in a memory (e.g., at least one memory 610 described below) associated with a system (e.g., as shown in FIG. 6) and executed by at least one processor (e.g., at least one processor 605 described below) associated with the system. For example, the processor may be associated with one or more of the blocks (e.g., the auction server 408 described below) or the apparatus 600. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the auction server 408 described below) and/or the apparatus 600. Although the steps described below are described as being executed by a processor, the steps are not necessarily executed by a same processor. In other words, at least one processor may execute the steps described below with regard to FIG. 1. If more than one processor executes the steps described below, the processors may or may not be associated with the same apparatus (e.g., server).

As shown in FIG. 1, in step S105 a processor (e.g., at least one processing unit 605) receives a ticket. For example, a call desk may receive a call from a client indicating an incident and/or problem. The call desk may enter the incident and/or problem into a trouble ticket system which may generate information about the incident and/or problem. The trouble ticket system may communicate the information to a server (including a processor) configured to generate a ticket based on the information. The server may communicate the ticket to a server (on the same hardware or different hardware) configured to allot the ticket to an agent.

In step S110 the processor categorizes the ticket. For example, the ticket may be associated with a hardware problem or a software problem. The ticket may be to request a service call or to schedule maintenance. The ticket may be associated with a product line or a system within a product line. The ticket may be associated with a geographic region. The ticket may be associated with a spoken language. Therefore, the ticket may be categorized based on any one (or more than one) of these factors. The ticket may be categorized based on factors not listed as well.

In step S115 the processor determines a group to broadcast the ticket to. For example, the ticket may be broadcast to a group having agents specializing in one of the aforementioned factors. For example, the ticket may be broadcast to a group in a geographic region. For example, the ticket may be broadcast to a group proficient in a particular spoken language. For example, the ticket may be broadcast to a group assigned to service products associated with a product line. For example, broadcasting the ticket may include sending a message to all (or a subset) members of a group. The message may include the ticket and/or information about the ticket. Members of a group may be stored in a memory (e.g., a database) associated with the processor. An agent may be a member of more than one group.

In step S120 the processor auctions the ticket within the group. For example, a subset of the agents (as a members of the group) may respond to the broadcast of the ticket by making a bid for the ticket. The bid may include an estimated time to resolution. In other words, each of the agents who bid on the ticket may return a date and/or time when the agent estimates a resolution to the ticket.

For example, an agent making a bid may take into consideration his/her own skills, capacity, resources available (e.g., access to equipment or collaboration with others), access to knowledge (e.g., tribal knowledge), and the like. Based on this knowledge, an agent may also decide not to bid. For example, a ticket may include information with regard to a requested resolution date/time. The agent may not have the capacity to resolve the ticket by the requested date/time and as a result not bid on the ticket. The result of the auction (e.g., the bids) may be saved in memory (e.g., a database), may be communicated to a device using a message, and the like.

In step S125 the processor fetches a time to resolution for the ticket. For example, the auction may result in no bids on the ticket, one bid on the ticket, or more that one bid on the ticket (where a bid includes an estimated resolution date/time). The processor may fetch (or receive) each of the bids and read the estimated time to resolution. For example, if the results of the auction are stored in memory, the processor may fetch the time to resolution by reading the memory (e.g., a look-up in a database).

In step S130 the processor notified the auction winner. For example, the fetch of the time to resolution may return more than one bid with an estimated time to resolution. The bid with the shortest estimated time to resolution may "win" the ticket. The agent associated with the bid having the shortest time to resolution may be notified that the agent has "won" the ticket.

In step S135 the processor notifies originator of the time to resolution. For example, the originator may receive a message indicating the estimated time to resolution associated with the "winning" bid.

Figure 2:
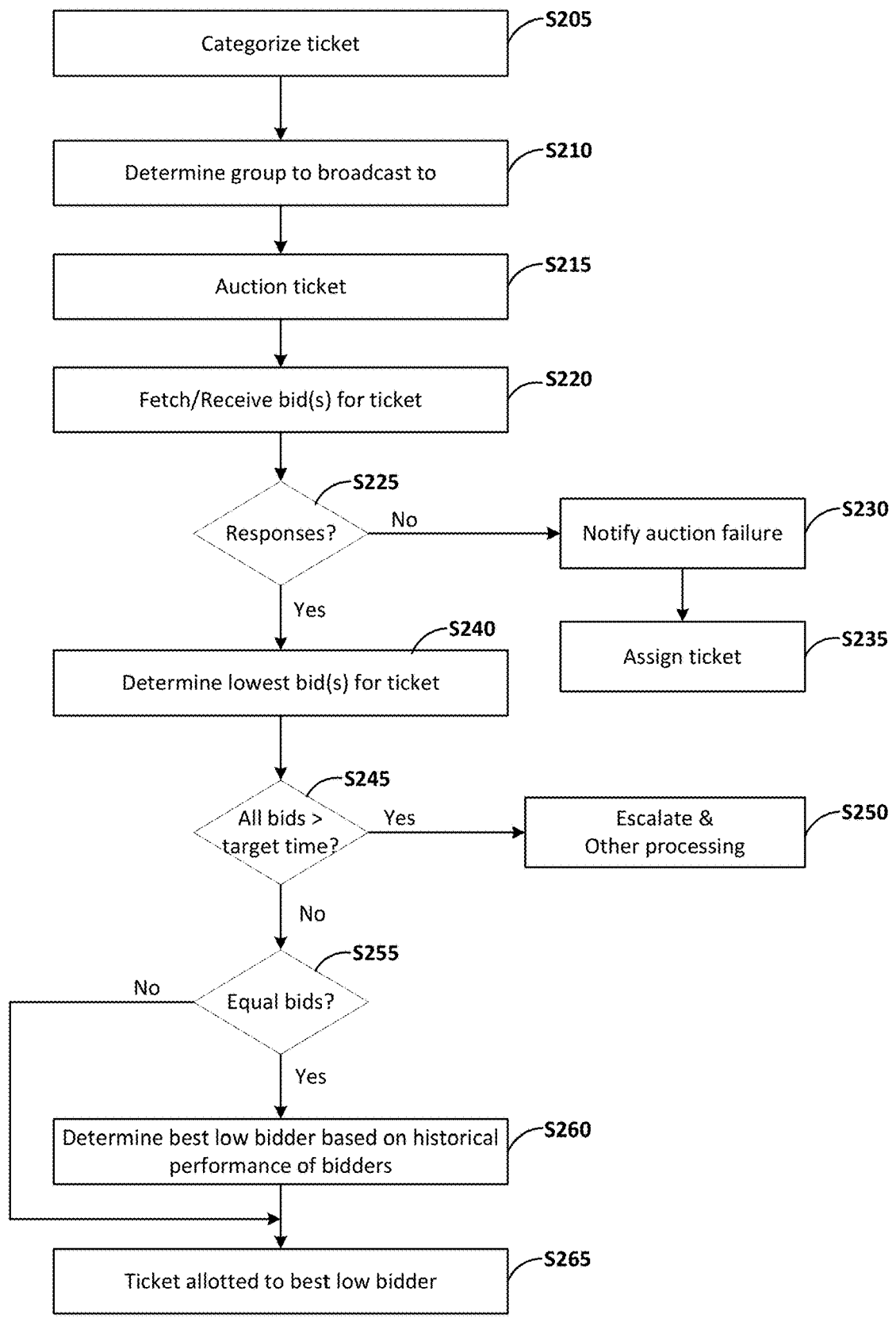
FIG. 2 illustrates a method for resolving an incident according to at least one example embodiment.

FIG. 2 illustrates another method for allotting a trouble ticket according to at least one example embodiment. The method steps described with regard to FIG. 2 may be executed as software code stored in a memory (e.g., at least one memory 610 described below) associated with a system (e.g., as shown in FIG. 6) and executed by at least one processor (e.g., at least one processor 605 described below) associated with the system. For example, the processor may be associated with one or more of the blocks (e.g., the auction server 408 described below) or the apparatus 600. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the auction server 408 described below) and/or the apparatus 600. Although the steps described below are described as being executed by a processor, the steps are not necessarily executed by a same processor. In other words, at least one processor may execute the steps described below with regard to FIG. 2. If more than one processor executes the steps described below, the processors may or may not be associated with the same apparatus (e.g., server).

As shown in FIG. 2, in step S205 a processor (e.g., at least one processing unit 605) categorizes a ticket. For example, the ticket may be associated with a hardware problem or a software problem. The ticket may be to request a service call or to schedule maintenance. The ticket may be associated with a product line or a system within a product line. The ticket may be associated with a geographic region. The ticket may be associated with a spoken language. Therefore, the ticket may be categorized based on any one (or more than one) of these factors. The ticket may be categorized based on factors not listed as well.

In step S210 the processor determines a group to broadcast the ticket to. For example, the ticket may be broadcast to a group having agents specializing in one of the aforementioned factors. For example, the ticket may be broadcast to a group in a geographic region. For example, the ticket may be broadcast to a group proficient in a particular spoken language. For example, the ticket may be broadcast to a group assigned to service products associated with a product line. For example, broadcasting a ticket may include sending a message to all (or a subset) members of a group. The message may include the ticket and/or information about the ticket. Members of a group may be stored in a memory (e.g., a database) associated with the processor. An agent may be a member of more than one group.

In step S215 the processor auctions the ticket within the group. For example, a subset of the agents (as a members of the group) may respond to the broadcast of the ticket by making a bid for the ticket. The bid may include an estimated time to resolution. In other words, each of the agents who bid on the ticket may return a date and/or time when the agent estimates a resolution to the ticket.

For example, an agent making a bid may take into consideration his/her own skills, capacity, resources available (e.g., access to equipment or collaboration with others), access to knowledge (e.g., tribal knowledge), and the like. Based on this knowledge, an agent may also decide not to bid. For example, a ticket may include information with regard to a requested resolution date/time. The agent may not have the capacity to resolve the ticket by the requested date/time and as a result not bid on the ticket. The agent may also need more information, need to acquire a skill, and/or clear work to generate capacity. If the agent can perform a task(s) necessary to resolve the ticket, the agent may respond with a bid including an estimated resolution date/time. If the agent cannot perform a task(s) necessary to resolve the ticket, the agent may respond with a bid marked as decline. If the agent needs more time and or information to determine if the agent can resolve the ticket, the agent may respond with a bid marked as hold. Further, a hold may include an associated wait time period over which a decision as to bid further may occur. For example, the agent may bid with an estimated time to resolution or a decline within the associated wait time period. The result of the auction (e.g., the bids) may be saved in memory (e.g., a database), may be communicated to a device using a message, and the like.

In step S220 the processor fetches bid(s) for the ticket. The processor may fetch (or receive) each of the bids and read the bids (e.g., estimated time to resolution). For example, if the results of the auction are stored in memory, the processor may fetch the time to resolution by reading the memory (e.g., a look-up in a database).

In step S225 the processor determines if there are responses (e.g., bids) for the ticket. If there are no responses, processing moves to step S230. Otherwise processing continues to step S240. For example, as discussed above, bids may include an estimated time to resolution, be marked as decline or be marked as hold. If there are no bids with an estimated time to resolution, the auction response may be determined to include no responses. In other words, if all of the bids are marked as decline or hold, the auction response may be determined to include no responses. Alternatively, if there is at least one bid with an estimated time to resolution, the auction response may be determined to include a response.

In step S230 the processor notifies an auction failure. For example, if there are no responses, the auction is marked as failing. A failing auction may be communicated (e.g., notified) to an entity capable of overriding the auction. For example, the auction may be communicated (e.g., notified) to a manager who, in step S235, manually assigns the ticket. In step S235 the manager may assign the ticket using conventional ticket assignment methods.

In step S240 the processor determines the lowest bid(s) for the ticket. For example, the processor may sort the bids based on estimated time to resolution. The tickets with the earliest (in time) estimated time to resolution may be determined to be the lowest bids for the ticket.

In step S245 the processor determines if all bids are greater than a target time. If all bids are greater than a target time, processing moves to step S250. Otherwise, processing continues to step S255. For example, the processor may read the first bid from the sorted bids (the first bid including the earliest estimated time to resolution). If the read first bid is greater than (e.g., later in time) then the target time for resolving the ticket, all bids are greater than the target time.

In step S250 the processor escalates the ticket and performs other ticket processing. For example, if there are no responses with an estimated time to resolution earlier than (or equal to) the target time for resolving the ticket, the auction may be marked for escalation. An auction marked for escalation may be communicated to an entity capable of overriding the auction. For example, the auction may be communicated to a manager. The manager may allocate the ticket in a number of ways. An auction that is marked for escalation may be re-run a predetermined number of times. For example, a configuration variable may be set that indicates a number of times an auction may be re-run. The processor may keep track of the number of times the auction has been re-run. If the number of re-runs equals and/or exceeds this configuration variable, the auction may be communicated to a manager for resolution.

In step S255 the processor determines if the bids are equal bids. If the bids are equal bids, processing continues to step S260. Otherwise, processing continues to step S265. For example, the processor may read the first bid from the sorted bids (the first bid including the earliest estimated time to resolution). The processor may then search for bids including an estimated time to resolution equal to the earliest estimated time to resolution. If the search returns one or more bids, the processor may determine the auction includes equal bids. The equal bids may be equal lowest bids.

In step S260 the processor determines a best low bidder based on historical performance of the bidders (e.g., agents bidding on the ticket). For example, historical performance may be a performance value stored in memory (e.g., a database) for each agent. The performance value may be determined based on a reward and penalty algorithm. Bonus points may be awarded to an agent for quicker completion of tickets than that which was estimated and allotted. Bonus points may vary exponentially based on how quickly a ticket was completed with respect to, for example, the estimated time to resolution and a predicted time.

A penalty may be assessed (e.g., points subtracted) for a breach of the estimated time to resolution. Penalties may be assessed such that that user's are not penalized heavily for small breaches of estimated time to resolution. Penalties may vary exponentially based on the estimated time to resolution bid by a lower bidder (e.g., the second lowest bidder) for that ticket. A penalty for breach of target time, which is the maximum time by which a ticket has to be resolved, may result in a higher penalty. A pressure factor may be included to minimize the penalty for breach of a high pressure job.

The performance value may be determined based on an allotment algorithm. A first allotment algorithm is described as follows:

Definitions $E_{n_t}$=The estimated time to resolution bid by an agent for a ticket n at time t.

$C_n$=The actual completion time of a ticket n.

$x_n$=The deviation of the actual completion time from the estimated time to resolution for $n^{th}$ ticket.

t=The time at which the auction for a ticket is considered as closed.

DF=The deviation factor for each completed ticket of an agent.

SDF=The sum of the deviation factor for all completed tickets of an agent.

$N_{dt}$=The total number of deviated tickets at time t.
$N_{ct}$=The total number of completed tickets at time t.
SDT=The sum of the deviation time for all completed tickets of an agent in minutes.

$SET_t$=The sum of the estimated time to resolution for all completed tickets of an agent in minutes.

DNC=The coefficient of deviation.

Equations $$x_{n_t} = E_{n_t} - C_n \quad (1)$$

$$SDT_{n_t} = \sum_{i=1}^{n-1} X_i = x_1 + x_2 + x_3 + \ldots + x_n \quad (2)$$

$$SET_{n_t} = \sum_{i=1}^{n-1} E_{i_t} = E_1 + E_2 + E_3 + \ldots + E_n \quad (3)$$

$$SDF_{(n-1)(t-1)} = \quad (4)$$

$$\sum_{i=1}^{n-1} X_i^2 = (x_i/E_1)^2 + (x_2/E_2)^2 + (x_3/E_3)^2 + \ldots + (x_{n-1_{t-1}}/E_{n-1_{t-1}})^2$$

$$DNC_{(t-1)} = \quad (5)$$
$$(N_{dt_{(t-1)}}/N_{ct_{(t-1)}}) \times (SDT_{(n-1)(t-1)}/SET_{(n-1)(t-1)}) \times SDF_{(N-1)(t-1)}$$

$$DF_n = x_n/E_{n_t} \quad (6)$$

$$DNC_n = \quad (7)$$
$$(N_{dt_t}/N_{ct_t}) \times (SDT_{n_t}/SET_{n_t}) \times [SDF_{(N-1)(T-1)}SDF_{(N-1)(T-1)} + DF_{n_t}]$$

Accordingly, depending on an agent's historical performance, a deviation may be calculated. The coefficient of deviation may be calculated when needed or upon completion of the ticket. If the coefficient of deviation is calculated when needed, the necessary variables may be stored in a memory (e.g., database) upon resolution of each ticket by an agent. Therefore, according to example embodiments, if the auction includes equal bids the best low bidder based on historical performance of the bidders may be based on the coefficient of deviation utilizing equation 7. In other words, the agent with the lowest coefficient of deviation (or sum of coefficient of deviations or average coefficient of deviation or mean coefficient of deviation) may be the best low bidder. Alternatively, if bidding agents do have equal coefficients of deviation, the ticket may be allotted randomly.

Further, a priority coefficient may be determined based on severity and impact of tasks currently allotted to each of the agents (e.g., currently in the agents queue). For example, a task with a lower priority coefficient may be of higher importance. As a result, an agent with a queue of tasks (or tickets associated with tasks) should (all other factors being equivalent) work on the task with the lowest priority coefficient first. A task with an associated severity of "urgent" and an associated impact of "large" may have an associated priority scale factor of zero (0). A task with an associated severity of "minor" and an associated impact of "small" may have an associated priority scale factor of one (1). The priority scale factor may range between zero (0) and one (1). An agent user interface may include color coded indicators associating a ticket with the priority scale factor.

Therefore, according to example embodiments, if the auction includes equal bids the best low bidder based on the lowest coefficient of deviation (or sum of coefficient of deviations or average coefficient of deviation or mean coefficient of deviation) may be scaled based on the priority coefficient. For example, two agents may have equal (or substantially equal) coefficients of deviation. However, a first agent may have an associated queue with mostly important tasks or tickets as compared to a second agent. Therefore, the first agent may have an associated priority coefficient that is lower than the second agent. As a result, the coefficient of deviation of each agent may be scaled (based on the priority coefficient) such that the ticket is allotted to the second agent because the second agent is working on lower priority tasks or tickets.

Further, a manager may assign tickets based on the priority coefficient. For example, if the auction includes equal bids and a manager has been tasked with assigning a ticket, the manager may assign the ticket to an agent with the highest priority coefficient. In other words, the manager may assign the ticket to the agent with the fewest important, least severe, and/or lowest number of high priority jobs in their queue. The priority coefficient may be determined as follows:

Definitions $P_{sf_i}$=The priority scale factor of a task type i.
Pc=The priority coefficient of all the tickets currently being handled by an agent (lower the Pc, the more important the job(s)).
$N_i$=The number of tickets of a task type i.
n=The number of task types of priority scale factors.

Equation $$Pc = \sum_{i=0}^{n} P_{sf_i} \times (1/N_i) = \quad (8)$$
$$P_{sf_1} \times (1/N_1) + P_{sf_2} \times (1/N_2) + \ldots + P_{sf_n} \times (1/N_n)$$

Further, a pressure factor may be determined based on completion of historical tasks under time pressure conditions. For example, a task with a predicted time to completion may have an associated target time to completion that is before the predicted time to completion. As a result, an agent may be pressured to complete a task in less time than predicted. For example, the larger the difference between the predicted time to completion and the associated target time to completion (assuming the target time to completion is before the predicted time to completion) the more pressure the task places on the agent and the higher the pressure factor may be. For example, the larger the difference between the predicted time to completion and the associated target time to completion (assuming the target time to completion is after the predicted time to completion) the lower pressure the task places on the agent and the lower the pressure factor may be.

Therefore, according to example embodiments, if the auction includes equal bids the best low bidder based on the lowest coefficient of deviation (or sum of coefficient of deviations or average coefficient of deviation or mean coefficient of deviation) may be scaled based on the pressure factor. For example, two agents may have equal (or substantially equal) coefficients of deviation. However, a first agent may have completed more tasks (historically) under pressure as compared to a second agent. Therefore, the first agent may have an associated pressure factor that is higher than the second agent. As a result, the coefficient of deviation of each agent may be scaled (based on the pressure factor) such that the ticket is allotted to the first agent because the first agent is more adept at completing tasks under pressure (e.g., time pressure).

Further, a manager may assign tickets based on the pressure factor. For example, if the auction includes equal bids and a manager has been tasked with assigning a ticket, the manager may assign the ticket to an agent with the highest pressure factor. In other words, the manager may assign the ticket to the agent that is more adept at completing tasks under pressure (e.g., time pressure). The pressure factor may be determined as follows:

Definitions $T_n$=The target completion time for a ticket n.
$P_n$=The predicted completion time for a ticket n.
Equation $$pf = P_n / T_n \qquad (9)$$

The performance value may be determined based on an allotment algorithm. A second allotment algorithm is described as follows:

Definitions $A_1(E_{n_t})$=The estimated time to resolution bid quoted by agent $A_1$ for a ticket n at time t.
$A_n(E_{n_t})$=The estimated time to resolution bid quoted by agent $A_n$ for a ticket n at time t.
$A_1(DNC_{(n-1)})$=The coefficient of deviation of agent $A_1$ for all completed (n−1) tickets.
$A_n(DNC_{(n-1)})$=The coefficient of deviation of agent $A_n$ for all completed (n−1) tickets.
$\Delta$=15, The minimum difference, in minutes, between the lowest bid and other bids, below which the bids would be considered as equal bids. Noting that 15 minutes is a design choice and may be varied based on design preferences.
Algorithm

```
If (equalBids) {
    If equal(CoefficientOfDeviation){
        Random allotment
    else
        AllotTo min(CoefficientOfDeviation)
    }
}
```

Accordingly, depending on an agent's historical performance, a deviation may be calculated for each agent. The coefficient of deviation may be calculated when needed or upon completion of the ticket. If the coefficient of deviation is calculated when needed, the necessary variables may be stored in a memory (e.g., database) upon resolution of each ticket by an agent. Therefore, according to example embodiments, if the auction includes equal bids the best low bidder based on historical performance of the bidders may be based on the coefficient of deviation utilizing the above algorithm. In other words, the agent with the lowest coefficient of deviation (or sum of coefficient of deviations or average coefficient of deviation or mean coefficient of deviation) may be the best low bidder if bidding agents do not have equal coefficients of deviation.

Further, as discussed above, a priority coefficient may be determined (see equation (8) above) based on severity and impact of tasks currently allotted to each of the agents (e.g., currently in the agents queue). Therefore, according to example embodiments, if the auction includes equal bids the best low bidder based on the lowest coefficient of deviation (or sum of coefficient of deviations or average coefficient of deviation or mean coefficient of deviation) may be scaled based on the priority coefficient. For example, the coefficient of deviation of each agent may be scaled (based on the priority coefficient) such that the ticket is allotted to an agent that is working on lower priority tasks or tickets.

In addition, as discussed above, a pressure factor may be determined (see equation (9) above) based on completion of historical tasks under time pressure conditions. Therefore, according to example embodiments, if the auction includes equal bids the best low bidder based on the lowest coefficient of deviation (or sum of coefficient of deviations or average coefficient of deviation or mean coefficient of deviation) may be scaled based on the pressure factor. For example, the coefficient of deviation of each agent may be scaled (based on the pressure factor) such that the ticket is allotted to the first agent because the first agent is more adept at completing tasks under pressure (e.g., time pressure).

Still further, a manager may assign tickets based on priority coefficient. For example, if the auction includes equal bids and a manager has been tasked with assigning a ticket, the manager may assign the ticket to an agent with the highest priority coefficient. In other words, the manager may assign the ticket to the agent with the fewest important, least severe, and/or lowest number of high priority jobs in their queue.

The manager may also assign tickets based on the pressure factor. For example, if the auction includes equal bids and a manager has been tasked with assigning a ticket, the manager may assign the ticket to an agent with the highest pressure factor. In other words, the manager may assign the ticket to the agent that is more adept at completing tasks under pressure (e.g., time pressure). Alternatively, if bidding agents do have equal coefficients of deviation, the ticket may be allotted randomly.

An example algorithm for reward is as follows:

Definitions $E_{n_t}$=The estimated time to resolution bid by an agent for a ticket n at time t.
$SE_{n_t}$=The second lowest estimated time to resolution bid by an agent for a ticket n at time t.
$T_n$=The target completion time for a ticket n.
$P_n$=The predicted completion time for a ticket n.
$C_n$=The actual completion time of a ticket n.
$A_1(C_n)$=The actual completion time of a ticket n by agent $A_1$.
$PT_n$=The points earned on completion of a ticket n.
pf=The pressure factor (from equation 9 above).
k=0.5, The points for completion of each ticket.
Equations Standard Points $$PT_n = pf \times (P_n / C_n) + k \times n \qquad (10)$$

-continued

Bonus

If $C_n < E_{n_t}$: (11)

$$PT_n = pf \times (P_n / C_n) + k \times n \times e^{E_{n_t} - C_n / P_n}$$

Penalty

If $C_n > T_n$: (12)

$$PT_n = (1/pf) \times ((E_{n_t} - T_n)/T_n)$$

If $SE_{n_t} > P_n$ and $C_n > SE_{n_t}$: (13)

$$PT_n = pf \times (P_n / C_n) + k \times n \times e^{E_{n_t} - SE_{n_t}/P_n}$$

Accordingly, depending on an agent's historical performance, a variable number of points may be earned upon completion of a ticket utilizing one of equations 10-13. The number of points may be calculated when needed or upon completion of the ticket. If the number of points is calculated when needed, the necessary variables may be stored in a memory (e.g., database) upon resolution of each ticket by an agent. According to example embodiments, the variable number of points may be used to reward an agent (e.g., a factor in a salary bonus). However, the variable number of points may be used in other ways. For example, the variable number of points may be used to offset a deviation coefficient calculation (e.g., add to or subtract from). Therefore, according to example embodiments, if the auction includes equal bids the best low bidder based on historical performance of the bidders may be based on the number of points earned utilizing equations 10-13.

In step S265 the processor allots the ticket to the best low bidder. For example, if in step S245 there are no equal bids, the best lowest bidder may be the agent with the bid including the earliest estimated time to resolution. Otherwise, the best lowest bidder may be the agent with one of the low bids and the agent having the best historical performance for completing tasks associated with a ticket.

The above equations may rely on variations of an estimated time (or target time) to completion. The estimated time (or target time) to completion may have or be combined with (e.g., multiplied by) a discontinuity factor. The discontinuity factor may be based on an amount of time a task is in a delay with regard to agent activity. For example, a task may include installing a database on a server. Installing the database may include initiating an install, entering some parameters, answering some install questions, waiting for the install process, answering some concluding questions, and the like. While the agent is waiting on the install process, the agent may be available for other tasks. Therefore, in evaluating an agent's performance, considering the effect of the use of this wait tame may be desirable. As a result, the discontinuity factor for this task may be based on the wait time.

In addition, the discontinuity factor may be evaluated (e.g., in a self learning process) as tasks (associated with tickets) are completed. If a task continually takes less time than estimated, the discontinuity factor may not be optimally set. For example, the wait time may be less than anticipated (e.g., the server on which the database is being installed on may perform better than expected). Further, the wait time may be more than anticipated (e.g., the server on which the database is being installed on may perform worse than expected). Therefore, the discontinuity factor may be varied as the system "learns" about a task. The discontinuity factor may be included in the ticket information as broadcast to agents during a ticket auction. Initially, the discontinuity factor may be set to a default setting (or value). Accordingly, varying the discontinuity factor may include varying the discontinuity factor as the system "learns" about a task. In other words, as the system "learns" about a task, the discontinuity factor may vary (e.g., up/down, higher/lower, positive/negative and the like) from the initial default setting.

Table 1 is an example of several scenarios that follow the method described with regard to the methods described herein. Table 1 illustrates scenarios where a group includes three members (Agent1, Agent2, and Agent3) each of whom may bid on an auction. The bids may be estimated time to resolution (ETR) which includes an associated estimated time to resolution; hold which includes at least one of an associated minimum and maximum hold time; and decline.

TABLE 1

| Scenario | Agent1 | Agent2 | Agent3 | Decision |
|---|---|---|---|---|
| 1 | ETR | ETR | ETR | Assign to minETR |
| 2 | ETR | ETR | Hold | Assign to minETR |
| 3 | ETR | Decline | Decline | Assign to minETR |
| 4 | ETR | Hold | Decline | If (lowest HoldTime <= maxHoldTime) <br>     Wait (Broadcast after maxHoldTime) <br> Else <br>     Broadcast |
| 5 | ETR | Hold | Hold | If (lowest HoldTime <= maxHoldTime) <br>     Wait (Broadcast after maxHoldTime) <br> Else <br>     Broadcast |
| 6 | Hold | Hold | Hold | If all Hold & !all HoldTime>=maxHoldTime <br> { <br>     Wait(Rebroadcast after lowest HoldTime <br> or maxHoldTime) <br> Else if all HoldTime>=maxHoldTime <br>     { escalate <br>     } |
| 7 | Decline | Decline | Hold | If all Hold & !all HoldTime>=maxHoldTime <br> { <br>     Wait(Rebroadcast after lowest |

TABLE 1-continued

| Scenario | Agent1 | Agent2 | Agent3 | Decision |
|---|---|---|---|---|
| | | | | HoldTime or maxHoldTime) Else if all HoldTime>=maxHoldTime { escalate } |
| 8 | Decline | Hold | Hold | Same as Scenario 7 |
| 9 | Decline | Decline | Decline | Notify Failed Auction Failed Auction { Check current workload of each player If all are overloaded { escalate } else { rebroadcast to group/agent with lowest workstack } } else if decline { escalate } |
| 10 | No Response | No Response | No Response | If WaitTime >=maxNoResponseWaitTime { Drop broadcast &notify/escalate } |

Figure 3:
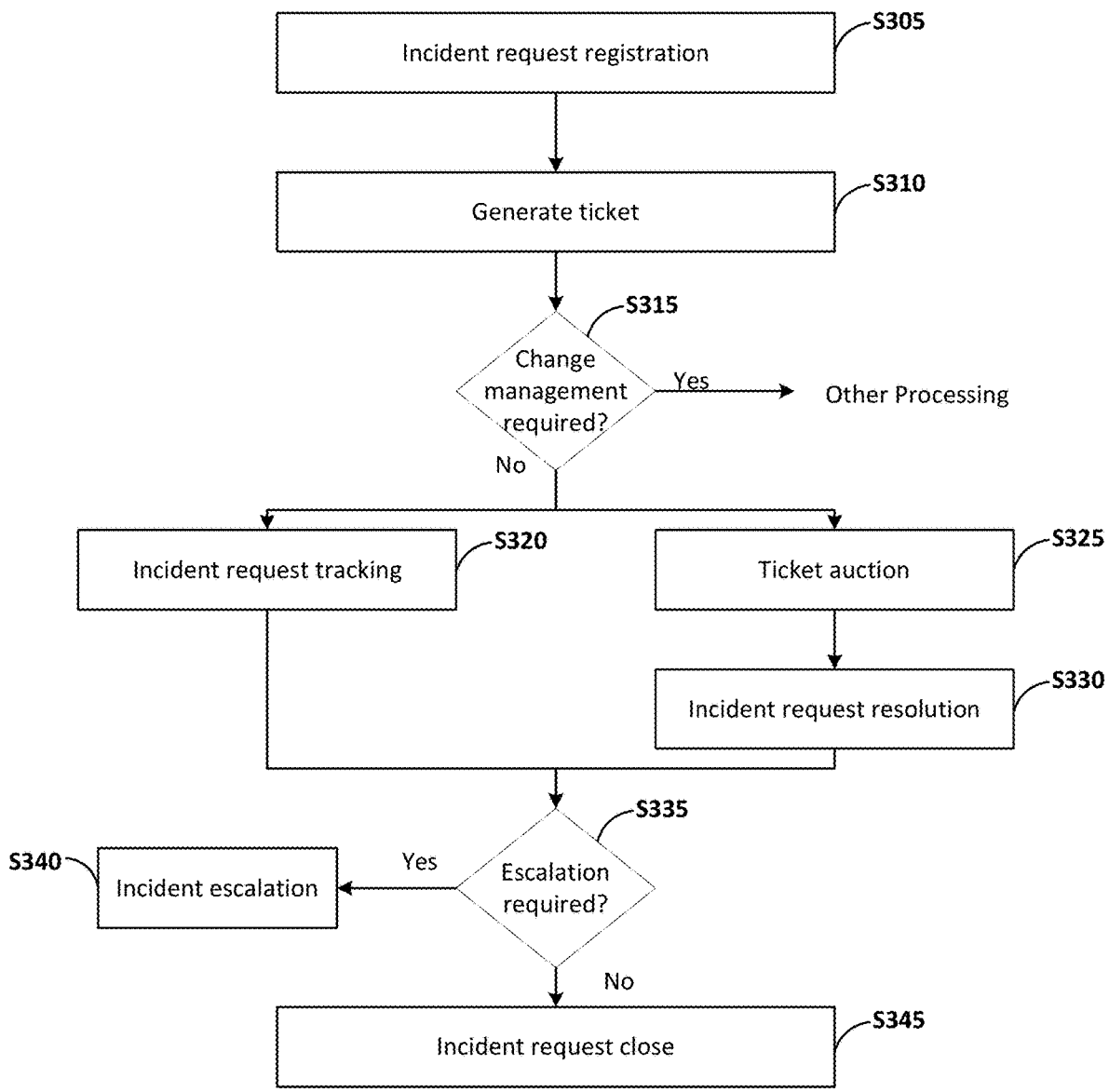
FIG. 3 illustrates another method for allotting a trouble ticket according to at least one example embodiment.

FIG. 3 illustrates a method for resolving an incident according to at least one example embodiment. The method steps described with regard to FIG. 3 may be executed as software code stored in a memory (e.g., at least one memory 610 described below) associated with a system (e.g., as shown in FIG. 6) and executed by at least one processor (e.g., at least one processor 605 described below) associated with the system. For example, the processor may be associated with one or more of the blocks (e.g., the auction server 408 described below) or the apparatus 600. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the auction server 408 described below) and/or the apparatus 600. Although the steps described below are described as being executed by a processor, the steps are not necessarily executed by a same processor. In other words, at least one processor may execute the steps described below with regard to FIG. 3. If more than one processor executes the steps described below, the processors may or may not be associated with the same apparatus (e.g., server).

As shown in FIG. 3, in step S305 a processor (e.g., at least one processing unit 605) registers an incident request. For example, a call desk may receive a call from a client indicating an incident and/or problem. The call desk may enter the incident and/or problem into a trouble ticket system which may generate information about the incident and/or problem.

In step S310 the processor generates a ticket. For example, information associated with the incident may be used to generate the ticket. The ticket may have an associated (system unique) identification number also known as, for example, a case, issue or call log number. The ticket may have an associated severity (e.g., how serious the incident is for the affected system), impact (e.g., what is the system effect), priority (e.g., the urgency on which the ticket should be resolved) and target time for completion or resolution. The information associated with the ticket (and the incident) may be stored in a memory (e.g., a database) in relation to the associated identification number.

In step S315 the processor determines if change management is required. If change management is required, some other processing is performed. Otherwise processing continues to steps S320 and S325. Step S320 and steps S325 and S330 may be performed in parallel. For example, change management may refer to a management process where changes are formally introduced and approved. As a result, ticket resolution may require more planning and execution than what is required by a typical agent (e.g., service technician). Therefore, processing may move outside of the current ticket allotment methods.

In step S320 the processor initiates incident request tracking. For example, issue tracking may manage and maintain lists of issues, as needed by an organization. Issue tracking may be used in an organization's customer support call center to create, update, and resolve reported customer issues, or even issues reported by that organization's other employees. An issue tracking system may also contain a knowledge base containing information on each customer, resolutions to common problems, and other such data. Therefore, the processor initiating incident request tracking may include entering the incident (e.g., adding the associated ticket identification number) into an incident request tracking system together with at least a portion of the information related to the incident that is utilized by the incident request tracking system. The entered incident may be indicated as an active incident.

In step S325 the processor performs the ticket auction. For example, as described above, the processor may categorize the ticket, determine a group based on the characterization and broadcast the ticket to the group, the agents (e.g., members of the group) may bid on the ticket (e.g., bid with an estimated time to resolution, a hold, or a decline), a winning bidder (e.g., agent) may be determined based on the bids, and the ticket may be allotted to the winning bidder. Further details with regard to the auction are described above with regard to FIGS. 1 and 2.

In step S330 the processor performs incident request resolution. For example, the agent (e.g., the agent who is the winning bidder) may perform one or more tasks in order to resolve the ticket based on the incident. The agent may close the ticket indicating the ticket as resolved or unresolved. The agent may also describe the tasks performed and the results of the tasks. The agent may enter this information in the incident request tracking system. The entries may include indicating a status of the incident. In addition, the incident may be indicated as unresolved if the ticket auction fails (e.g., no bids on the ticket or no bids with an estimated resolution time less than a target time for resolving the ticket).

In step S335 the processor determines if escalation is required. If incident escalation is required, processing moves to step S340. Otherwise processing continues to step S345. For example, if the agent indicates the ticket as resolved, no escalation may be required. If the agent indicates the ticket as unresolved, escalation may be required. Further, the agent may indicate the ticket as resolved with escalation required. For example, the agent may have discovered a design flaw (e.g., a software bug or security risk) during the resolution of the ticket. The design flaw may or may not be related to the incident on which the ticket is based. Further, escalation may be based on the result of the auction. For example, if the auction fails, the incident/ticket may be escalated. If an agent fails to act on a ticket within a prescribed time an escalation may be required. For example, if an elapsed time since allotting the ticket has expired and/or if no action has occurred prior to a latest start time that should result in resolving the issue before the target time, the incident/ticket may be escalated.

In step S340 the processor performs an incident escalation. For example, if there are no responses with an estimated time to resolution earlier than (or equal to) the target time for resolving the ticket, the incident may be marked for escalation. An auction marked for escalation may be communicated to an entity capable of taking action based on the escalation. For example, the auction may be communicated to a manager. The manager may take action to, for example, manually assign the ticket, generate an incident to investigate and resolve the design flaw, reassign the ticket to an agent who can perform tasks the original agent could not, and/or take further step directed toward resolving the ticket/issue. An auction that is marked for escalation may be re-run a predetermined number of times. For example, a configuration variable may be set that indicates a number of times an auction may be re-run. The processor may keep track of the number of times the auction has been re-run. If the number of re-runs equals and/or exceeds this configuration variable, the auction may be communicated to a manager for resolution.

In step S345 the processor closes the incident request. For example, the incident entered in the incident request tracking system may be indicated as a closed incident. Closing the incident may include adding feedback information. For example, as discussed above, closing the incident may include adding the actual completion time of a ticket ($C_n$) or any other data utilized in the above algorithms.

Figure 4A:
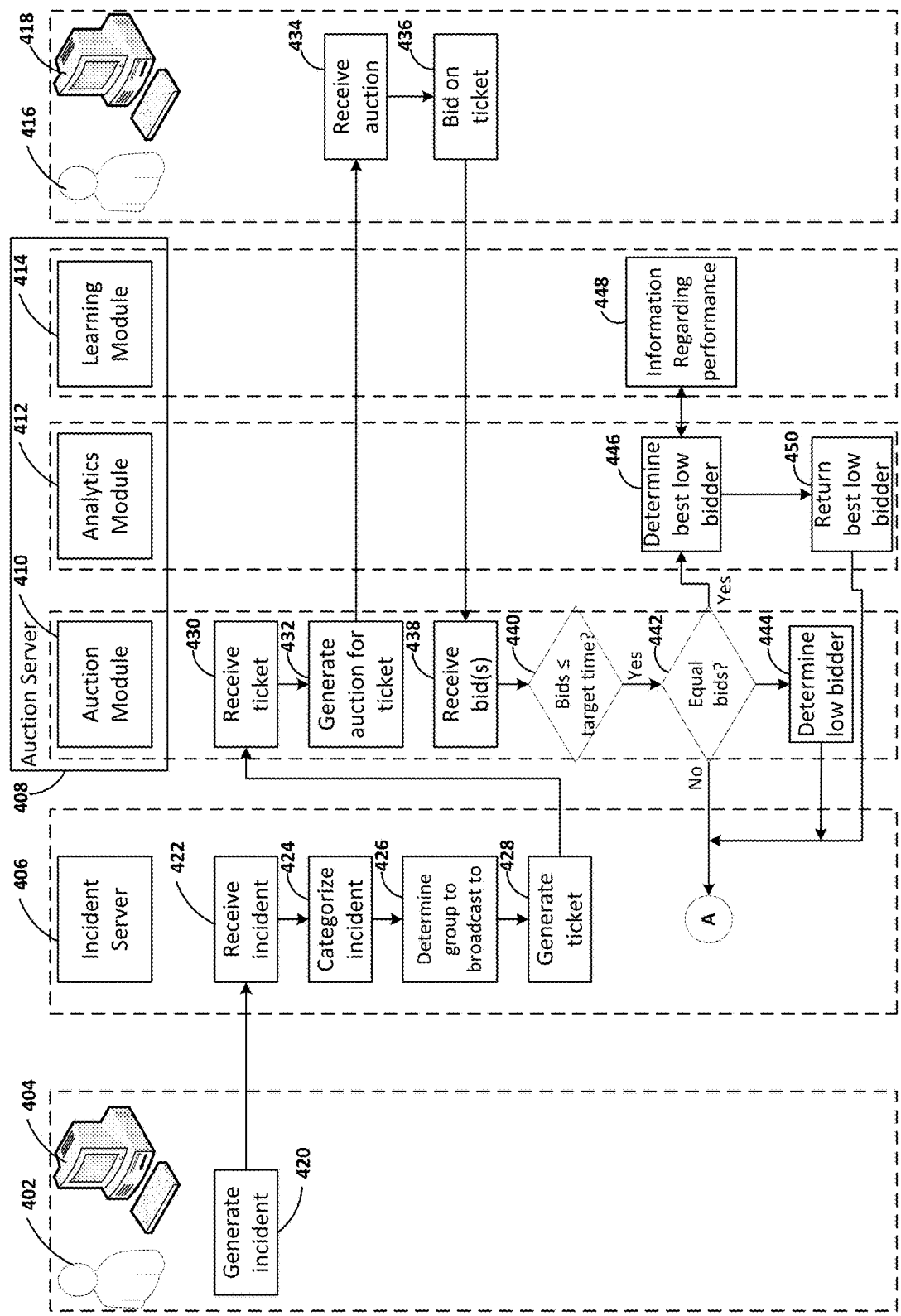
FIGS. 4A and 4B illustrate a signal flow diagram for auctioning tickets according to at least one example embodiment.
Figure 4B:
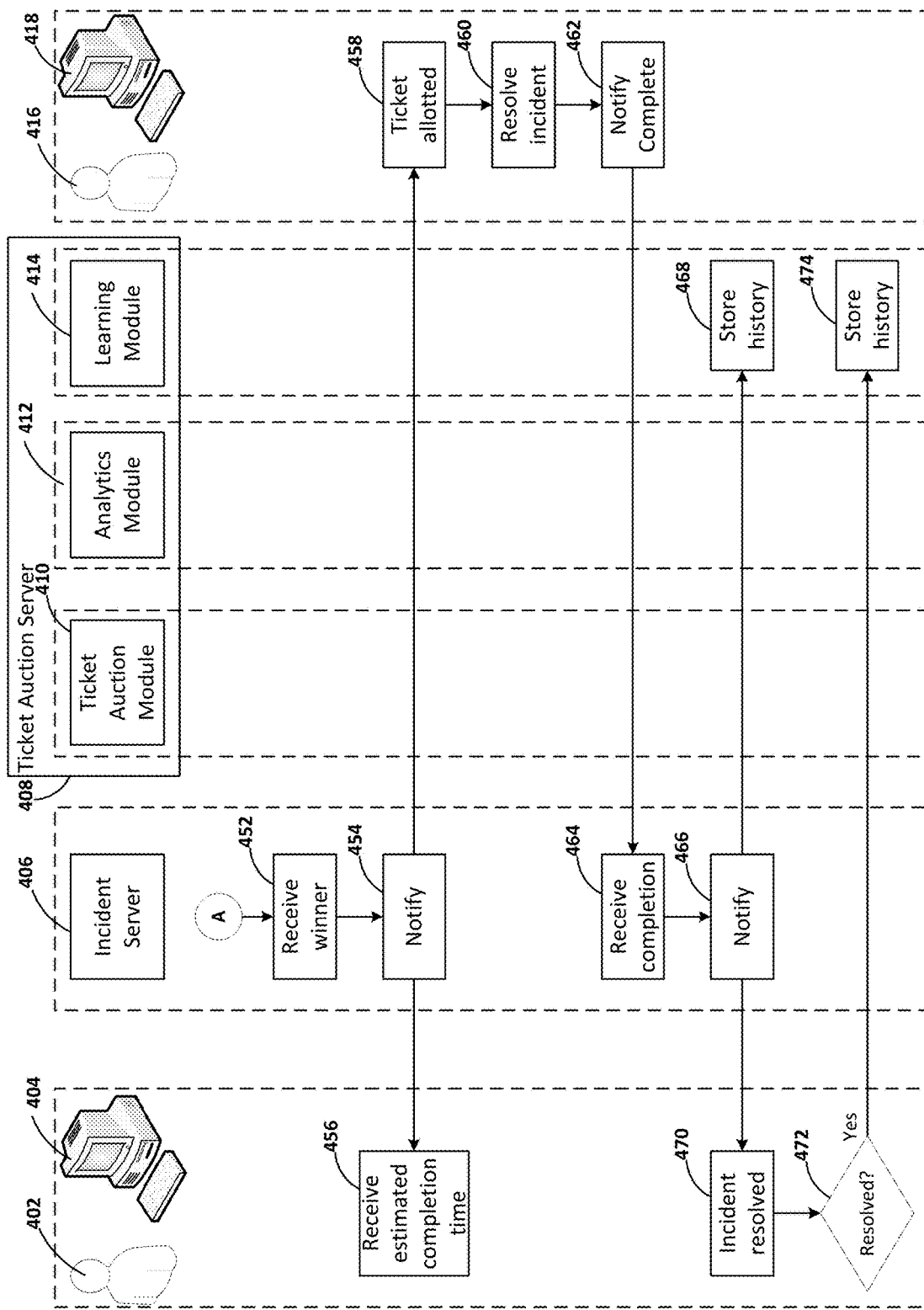

FIGS. 4A and 4B illustrate a signal flow diagram for auctioning tickets according to at least one example embodiment. The blocks described with regard to FIGS. 4A and 4B may be executed as software code stored in a memory (e.g., at least one memory 610) associated with a system (e.g., as shown in FIG. 6) and executed by at least one processor (e.g., at least one processor 605) associated with the system. For example, the processor may be associated with one or more of the blocks (e.g., blocks 404, 406, 408, 418) or the apparatus 600. However, alternative embodiments are contemplated such as a system embodied as a special purpose processor.

For example, the blocks may be performed by an application-specific integrated circuit, or ASIC. For example, the ASIC may be configured as one or more of the blocks (e.g., blocks 404, 406, 408, 418) and/or the apparatus 600. Although the blocks described below are described as being executed by a processor, the blocks are not necessarily executed by a same processor. In other words, at least one processor may execute the blocks described below with regard to FIGS. 4A and 4B.

As shown in FIGS. 4A and 4B, an incident creation user interface computer 404, an incident server 406, an auction server 408 and an agent interface computer 418 may operate together to allot a ticket to an agent (e.g., a service technician). The incident creation user interface computer 404, the incident server 406, the auction server 408 and the agent interface computer 418 may be communicatively coupled via, for example, the internet and/or an intranet. The incident creation user interface 404 and the agent interface may be a user interface operating on a client (e.g., personal) computer configured to enable a user 402 and an agent 416 to interact with the system.

The action server 408 may include an auction module 410, an analytics module 412 and a learning module 414. The auction module 410, the analytics module 412 and the learning module 414 may function together to perform trouble ticket allotment. The action server 408 may be configured to allot a ticket to an agent based on the results of an auction for the ticket. The action server 408 may also be configured to allot a ticket to an agent based on the agents past performance in resolving tickets.

As shown in FIG. 4A, a user 402 (e.g., customer service representative) generates an incident (block 420). For example, a call desk may receive a call from a client indicating an incident and/or problem. The call desk may enter the incident and/or problem into a trouble ticket system which may generate information about the incident and/or problem. The incident server 406 receives (block 422) the incident (e.g., via a message) from the incident creation user interface computer 404. The incident server 406 then categorizes the incident (block 424) and determines a group to broadcast to (block 426). For example, the ticket may be associated with a hardware problem or a software problem. The ticket may be to request a service call or to schedule maintenance. The ticket may be associated with a product line or a system within a product line. The ticket may be associated with a geographic region. The ticket may be associated with a spoken language. Therefore, the ticket may be categorized based on any one (or more than one) of these factors. The ticket may be categorized based on factors not listed as well.

For example, the ticket may be broadcast to a group having agents specializing in one of the aforementioned factors. For example, the ticket may be broadcast to a group in a geographic region. For example, the ticket may be broadcast to a group proficient in a particular spoken language. For example, the ticket may be broadcast to a group assigned to service products associated with a product line. For example, broadcasting a ticket may include sending a message to all (or a subset) members of a group. The message may include the ticket and/or information about the ticket. Members of a group may be stored in a memory (e.g., a database) associated with the processor. An agent may be a member of more than one group. The incident server 406 then generates the ticket (block 428). The ticket may include a reference to information associated with the categorization and the group to broadcast to. The auction server 408 receives (block 430) the ticket (e.g., via a message) from the incident server 406. An auction for the ticket is generated (block 432).

The auction may be broadcast based on the group (e.g., from block 426), which is then received by (a plurality of) agents 416 (block 434) using the agent interface computer 418. The (plurality of) agents 436 bid on the ticket (block 436). For example, a subset of the agents (as a members of the group) may respond to the broadcast of the ticket by making a bid for the ticket. The bid may include an estimated time to resolution. In other words, each of the agents who bid on the ticket may return a date and/or time when the agent estimates a resolution to the ticket.

For example, an agent making a bid may take into consideration his/her own skills, capacity, resources available (e.g., access to equipment or collaboration with others), access to knowledge (e.g., tribal knowledge), and the like. Based on this knowledge, an agent may also decide not to bid (or indicate a bid as decline). For example, a ticket may include information with regard to a requested resolution date/time. The agent may not have the capacity to resolve the ticket by the requested date/time and as a result not bid on the ticket. The result of the auction (e.g., the bids) may be saved in memory (e.g., a database), may be communicated to a device using a message, and the like. For example, a subset of the agents (as a member of the group) may respond to the broadcast of the ticket by making a bid for the ticket. The bid may include an estimated time to resolution. In other words, each of the agents who bid on the ticket may return a date and/or time when the agent estimates a resolution to the ticket.

The agent may also need more information, need to acquire a skill, and/or clear work to generate capacity. If the agent can perform a task(s) necessary to resolve the ticket, the agent may respond with a bid including an estimated resolution date/time. If the agent cannot perform a task(s) necessary to resolve the ticket, the agent may respond with a bid marked as decline. If the agent needs more time and or information to determine if the agent can resolve the ticket, the agent may respond with a bid marked as hold. Further, a hold may include an associated wait time period over which a decision as to bid further may occur. For example, the agent may bid with an estimated time to resolution or a decline within the associated wait time period. The result of the auction (e.g., the bids) may be saved in memory (e.g., a database), may be communicated to a device using a message, and the like.

Further details with regard to the auction and bidding are described above with regard to FIGS. 1 and 2. Example bid scenarios are described above with regard to Table 1. The auction server 408 fetches/receives the bid(s) (block 438). The auction server 408 determines if the bid(s) include bids with an estimated resolution time less than or equal to a target completion time (block 440). For example, the auction server 408 may sort bids based on the estimated time to resolution and read the first bid from the sorted bids (the first bid including the earliest estimated time to resolution). If the read first bid is greater than (e.g., later in time) then the target time for resolving the ticket, all bids are greater than the target time.

If the bid(s) include bids with an estimated resolution time less than or equal to a target completion time, the auction server 408 determines if there are bids including equal estimated resolution times (block 442). If there are bids including equal estimated resolution times, the auction server 408 determines the best low bidder (block 446) and communicates the best low bidder (block 450) to the incident server 406. Determining the best low bidder may be based on historical performance of the bidders (e.g., agents bidding on the ticket). For example, historical performance may be a performance value stored in memory (e.g., a database) for each agent. The performance value may be determined based on a reward and penalty algorithm, and/or an algorithm including a coefficient of deviation as described above. If there are no bids including equal estimated resolution times, the auction server 408 determines the low bidder (block 444) and communicates the low bidder to the incident server 406.

As shown in FIG. 4B, the incident server 406 receives the winner (block 452) of the auction. The incident server 406 notifies the winner of the auction (e.g., as an allotment of the ticket) and the user 402 (e.g., customer service representative) of the allotted ticket (block 454) via the agent interface computer 418 and the incident creation user interface computer 404 respectively. The agent 416 takes action to resolve the incident (block 460) associated with the ticket and notifies (block 462) the incident server 406 the resolution is completed.

The incident server 406 receives (block 464) the notification that the incident resolution is completed and notifies (block 466) the user 402 of the completion and the auction server 408 stores history (block 468). The stored history may be associated with performance of the bidders (e.g., agents bidding on the ticket). For example, historical performance may be a performance value(s) stored in memory (e.g., a database) for each agent. The stored history may be date (e.g., variables) for use with any of equations 1-13 described above. The user 470 checks that the incident is resolved (block 470) and if the incident is resolved (block 474) the auction server 408 stores history (block 474).

Figure 5:
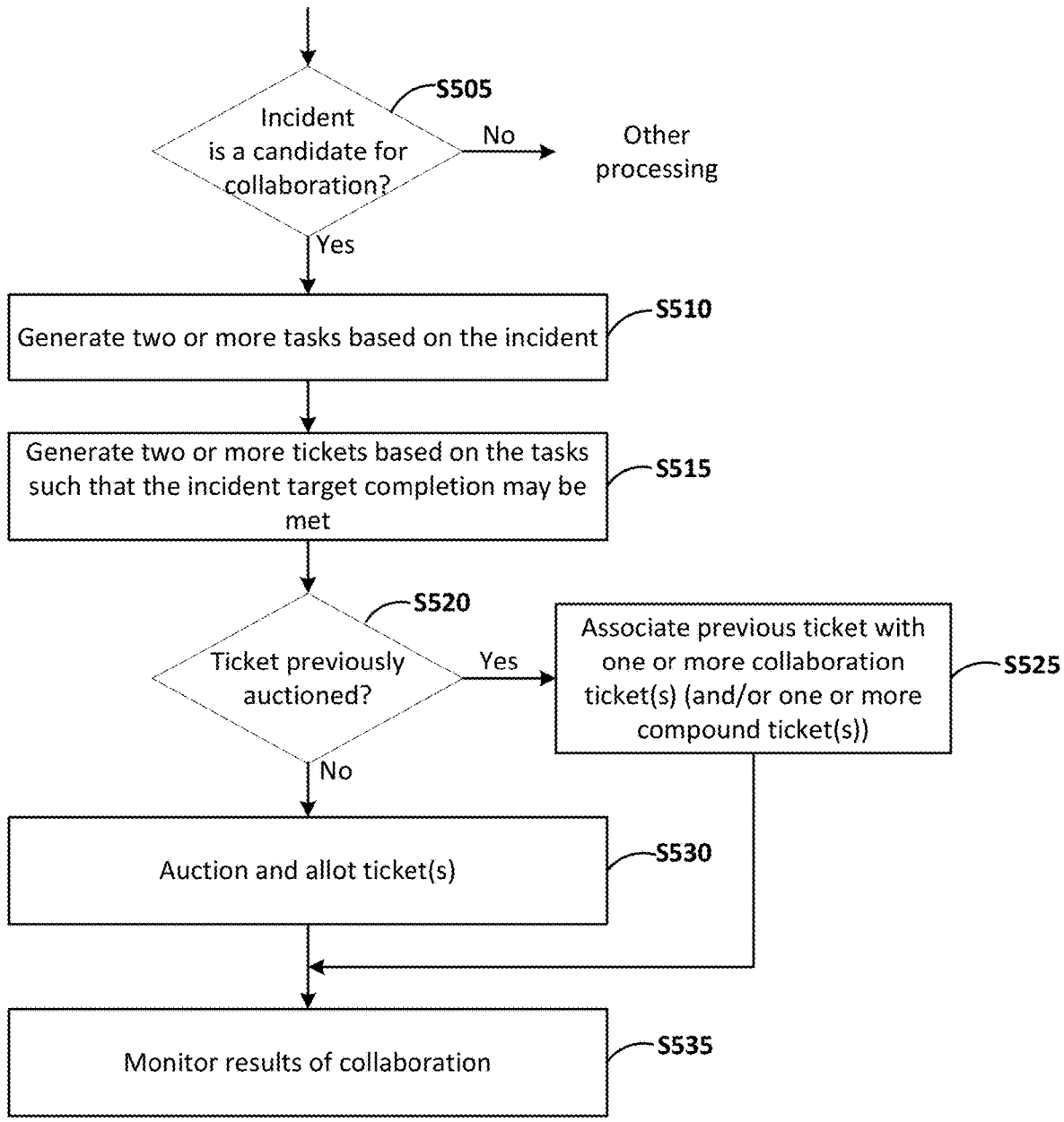
FIG. 5 illustrates a method for collaboration according to at least one example embodiment.

FIG. 5 illustrates a method for collaboration according to at least one example embodiment. The method steps described with regard to FIG. 5 may be executed as software code stored in a memory (e.g., at least one memory 610 described below) associated with a system (e.g., as shown in FIG. 6) and executed by at least one processor (e.g., at least one processor 605 described below) associated with the system. For example, the processor may be associated with one or more of the blocks (e.g., the auction server 408 described above) or the apparatus 600. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the auction server 408 described above) and/or the apparatus 600. Although the steps described below are described as being executed by a processor, the steps are not necessarily executed by a same processor. In other words, at least one processor may execute the steps described below with regard to FIG. 5. If more than one processor executes the steps described below, the processors may or may not be associated with the same apparatus (e.g., server).

As shown in FIG. 5, in step S505 a processor (e.g., at least one processing unit 605) determines if the incident is a candidate for collaboration. Collaboration may include two or more agents working together to resolve one incident. Collaboration may include breaking the steps to resolve an incident into two or more tasks. Each of the two or more tasks may be resolved by different agents. In its simplest form, agents may work together to resolve an incident without utilizing the system and methods described herein. For example, two agents may work side-by-side to collaborate on a ticket allotted to one of the agents.

However, the system and methods described herein may also be utilized to initiate collaboration and respond to a request for collaboration. For example, an incident (and/or ticket) may include (or be broken into) three tasks. The three tasks may include, for example, install a server upgrade, configure the server upgrade and test the server performance following the server upgrade. An agent preparing to bid on the ticket may have the skills to install and configure the server upgrade, but not have the skills (or not be authorized to) test the server performance following the server upgrade. The agent may request/indicate the ticket is a candidate for collaboration. An agent may also initiate an auction. For example, the agent may generate a new ticket for testing the server performance following the server upgrade. As a result, the original ticket may become a compound ticket. In other words, the agent may re-auction a sub-ticket to a group (or sub-group) including the skills to perform a test of the server performance following the server upgrade. In this way, the original ticket may be broken down into a compound ticket with sub-tasks being auctioned as sub-tickets. This re-auction process may be repeated until all tasks associated with the original ticket are allotted to an agent capable of completing the task. As with the collaborative ticket, Alternatively, or in addition to, the incident may be recognized as a candidate for collaboration prior to generating tickets. For example (using the same scenario), the incident server 406 and/or the ticket auction server 408 may be configured to identify candidates for collaboration. In this case, the incident server 406 and/or the ticket auction server 408 may evaluate the tasks associated with the incident and determine that server performance testing is performed separate (e.g., by a different group) from the installation and configuration of the server upgrade. In addition, in response to one or more hold bid(s), the incident server 406 and/or the ticket auction server 408 may evaluate the tasks associated with the incident and determine the incident is a candidate for collaboration. The incident server 406 and/or the ticket auction server 408 may evaluate the tasks associated with the incident and determine based on historical analysis/results of similar (or substantially similar) tasks. As a result, the incident server 406 and/or the ticket auction server 408 may identify the incident as a candidate for collaboration. If the incident is a candidate for collaboration processing continues to step S510. Otherwise some other processing is performed.

In step S510 the processor generates two or more tasks based on the incident. The two or more tasks may be tasks (or groups of tasks) that should be performed by different agents. For example, as described above, the tasks may include installing a server upgrade, configuring the server upgrade and testing the server performance following the server upgrade.

In step S515 the processor generates two or more tickets based on the tasks such that the incident target completion may be met. The tickets may include a group tasks and/or single tasks. For example, a separate ticket may be generated for each of the tasks including one ticket for installing a server upgrade, one ticket for configuring the server upgrade and one ticket for testing the server performance following the server upgrade. Alternatively, tasks may be grouped in a ticket. For example, one ticket for installing a server upgrade and configuring the server upgrade, and another ticket for testing the server performance following the server upgrade. The tickets may be associated as compound tickets.

In a collaboration scenario, each task should be completed before the target resolution date/time for the incident. Therefore, the ticket (and/or compound ticket) may include a target resolution date/time for the ticket. If each task can be performed in parallel, the target resolution date/time for the task may be the same as the target resolution date/time for the incident. However, if two or more of the tasks are sequential tasks, the target resolution date/time for a first task in a sequence should be sufficiently earlier in time to allow for sequential completion of a second or subsequent task in the sequence such that the target resolution date/time for the incident is met. Therefore, each ticket may include information based on the tasks and the incident. For example, the ticket may include a target resolution date/time for the incident and a target resolution date/time for the task. The target resolution date/time for the incident and the target resolution date/time for the task (and other tasks associated with the incident) may be the same or different based on whether or not the tasks can be performed in parallel or sequentially and where in an order of the sequence the task falls.

In step S520 the processor determines if a ticket associated with the incident has been previously auctioned. For example, as described above, an agent may request/indicate the ticket is a candidate for collaboration. In this case, a ticket has already been auctioned. The agent may or may not have bid on the ticket and/or the ticket may or may not have been allocated. If, for example, the ticket was not allotted or was placed on hold, the ticket may be indicated as not having been auction and, for example, the previously generated ticket cleared or obsoleted. If the ticket associated with the incident has been previously auctioned, processing moves to step S525. Otherwise processing continues to step S530.

In step S525 the processor associates the previous ticket with one or more collaboration tickets (e.g., tickets generated in step S515). For example, the tickets may be linked in an assignment database. For example, the one or more collaboration tickets may be assigned a same number (or a number based on) the previous ticket. For example, a compound ticket may include a link to a number of sub-tickets in, for example, a node-leaf(s) structure.

In step S530 the processor auctions and allots the ticket(s). For example, the ticket(s) (e.g., the tickets that are not associated with a previous auction) are auctioned and allocated as described above with regard to FIG. 1-4B.

In step S535 the processor monitors the results of the collaboration. For example, unique problems arise with collaboration. The unique problems may be, for example, performance of intermediate tasks on-time, passing information forward to subsequent tasks, feeding back information to previous tasks, and the like. Parameters may be established that may be monitored based on the agent (and/or system) performance of these unique problems. For example, a coefficient of deviation (as described above) and/or a discontinuity value (as described above) may be adjusted based on an agent's performance on collaboration tasks.

FIG. 6 illustrates an apparatus according to at least one example embodiment. As shown in FIG. 6, the apparatus 600 includes at least one processing unit 605, and at least one memory 610. The at least one processing unit 605 and the at least one memory 610 are communicatively coupled via bus 625. The apparatus 600 may be, for example, an element of the auction server 408.

In the example of FIG. 6, the apparatus 600 may be at least one computing device and should be understood to represent virtually any computing device configured to perform the methods described herein. As such, the apparatus 600 may be understood to include various standard components which may be utilized to implement the techniques described herein, or different or future versions thereof. By way of example, the apparatus 600 is illustrated as including the at least one processing unit 605, as well as at least one memory 610 (e.g., a computer readable storage medium).

Thus, as may be appreciated, the at least one processing unit 605 may be utilized to execute instructions stored on the at least one memory 610, so as to thereby implement the various features and functions described herein, or additional or alternative features and functions. Of course, the at least one processing unit 605 and the at least one memory 610 may be utilized for various other purposes. In particular, it may be appreciated that the at least one memory 610 may be understood to represent an example of various types of memory and related hardware and software which might be used to implement any one of the modules described herein. Systems and/or methods described below may include data and/or storage elements. The data and/or storage elements (e.g., data base tables) may be stored in, for example, the at least one memory 610.

The auction module 410, the analytics module 412 and the learning module 414 may be stored on the at least one memory 610. For example, the auction module 410, the analytics module 412 and the learning module 414 may be a plugin software stored on the at least one memory 610. The auction module 410, the analytics module 412 and the learning module 414 may include data and/or code that when executed by the at least one processing unit 605 performs the functions associated with the auction module 410, the analytics module 412 and the learning module 414. Alternatively, or in addition to, the auction module 410, the analytics module 412 and the learning module 414 may be an application-specific integrated circuit, or ASIC. For example, the ASIC may be configured as one or more of the module, or elements of the modules, of the auction module 410, the analytics module 412 and the learning module 414. The auction module 410, the analytics module 412 and the learning module 414 may be a standalone hardware module including a processor (not shown) configured to perform the associated functions.

The auction module 410 may be configured to allocate a ticket to an agent based on an auction. The analytics module 412 may be configured to determine a best bidder based on historical performance of the bidders (e.g., agents bidding on the ticket). The learning module 414 may be configured to store historical performance data (used by the analytics module 412) in memory (e.g., a database) for each agent.

The enclosed figures provide further details regarding the introduction of Auctioning to the equation, reward based proactive participation, collaboration in resolving 'compound tickets', and race condition handling. The enclosed figures provide further details regarding a decision making matrix, self learning and discontinuity, an allotment algorithm (equal bids), and a rewards and penalty calculation.

Example embodiments may, at least, emphasize on allotment as against assignment by bringing in auctioning to the equation, tap into the tribal knowledge, encourage proactive participation, learn continuously, and works in conjunction with the existing system with regard to ticket assignment.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising
receiving, at an incident server, a ticket indicating a problem;
generating, at an auction server, an auction for the ticket;
generating, at the auction server, a plurality of messages based on the auction;
communicating, by the auction server, the plurality of messages to a plurality of agents as participants in the auction;
receiving, at the auction server, at least two responses to resolve the problem from at least two agents, the at least two responses including one of a bid, a hold, and a no bid, the bid including a time to resolution;
determining, at the auction server, that there is a conflict between two or more bids;
upon determining there is a conflict between the two or more bids:
resolving the conflict between the two or more bids based on a coefficient of deviation for each of the agents who responded, wherein the coefficient of deviation is calculated based on an estimated time for resolution for at least one completed ticket and an actual completion time for the at least one completed ticket; and
allocating, at the incident server, the ticket to one of the plurality of agents based on the resolved conflict, including automatically sending an electronic notification assigning the ticket to the one of the plurality of agents, the ticket including the time to resolution,
wherein the coefficient of deviation for an agent who responded is calculated using:

$$DNC_n = (N_{dt}/N_{ct}) \times (SDT_{n_t}/SET_{n_t}) \times [SDF_{(N-1)(T-1)} SDF_{(N-1)(T-1)} + DF_{n_t}]$$

wherein:
DNC is the coefficient of deviation,
$N_{dt}$ is a total number of deviated tickets at time t,
$N_{ct}$ is a total number of completed tickets at time t,
SDT is a sum of a deviation time for all completed tickets of the agent in minutes,
$SET_t$ is a sum of an estimated time to resolution for all completed tickets of the agent in minutes,
SDF is a sum of a deviation factor for all completed tickets of the agent, and
DF is a deviation factor for each completed ticket of the agent,
and further wherein the auction server includes a learning module configured to execute an iterative computer operation that performs self-learning over multiple iterations of auctions for tickets and corresponding ticket resolutions, to track and optimize a discontinuity value, the discontinuity value being used by the auction server to adjust the time to resolution based on the multiple iterations.

2. The method of claim 1, wherein generating an auction includes:
determining a group based on the problem; and
broadcasting the ticket to the group.

3. The method of claim 1, wherein allotting the ticket includes:
fetching the time to resolution for each of the bids;
determining an auction winner based on a lowest time to resolution;
allotting the ticket to the auction winner; and
notifying the auction winner that the auction winner has been allotted the ticket.

4. The method of claim 1, further comprising:
fetching the time to resolution for each of the bids;
determining if the time to resolution for all of the bids is greater than a target time to resolution; and
if the time to resolution for all of the bids is greater than a target time to resolution, re-running the auction.

5. The method of claim 1, further comprising:
fetching the time to resolution for each of the bids;
determining if the time to resolution for all of the bids is greater than a target time to resolution; and
if the time to resolution for all of the bids is greater than a target time to resolution, notify a management entity.

6. The method of claim 1, further comprising:
determining if all of the bids include a no bid; and
if all of the bids include a no bid, assigning the ticket to an agent.

7. The method of claim 1, further comprising:
fetching the time to resolution for each of the bids;
determining if the time to resolution for two or more of the bids are within a range of each other; and
if the time to resolution for two or more of the bids are within a range of each other, allot the ticket based on a historical performance of the agents with the bids within a range of each other.

8. The method of claim 1, further comprising:
fetching the time to resolution for each of the bids;
determining if the time to resolution for two or more of the bids are within a range of each other;
determining a priority coefficient based on severity and impact of tasks for each of the agents with the bids within a range of each other; and
if the time to resolution for two or more of the bids are within a range of each other, allot the ticket based on a historical performance of the agents with the bids within a range of each other, wherein the historical performance is scaled based on the priority coefficient.

9. The method of claim 1, further comprising:
fetching the time to resolution for each of the bids;
determining if the time to resolution for two or more of the bids are within a range of each other; and
if the time to resolution for two or more of the bids are within a range of each other, allot the ticket based on the coefficient of deviation associated with the agents with the bids within a range of each other.

10. The method of claim 1, further comprising:
fetching the time to resolution for each of the bids;
determining if the time to resolution for two or more of the bids are within a range of each other;
determining a pressure factor based on completion of historical tasks under time pressure conditions for each of the agents with the bids within a range of each other; and
if the time to resolution for two or more of the bids are within a range of each other, allot the ticket based on a historical performance of the agents with the bids within a range of each other, wherein the historical performance is scaled based on the pressure factor.

11. The method of claim 1, further comprising:
determining if an incident associated with the problem is a candidate for collaboration; and
if the incident is a candidate for collaboration:
generating two or more tickets for the incident based on a number of tasks associated with resolving the incident;
generating an auction for each of the two or more tickets; and
monitoring the results of the collaboration.

12. The method of claim 11, wherein at least one of the two or more tickets is associated with two or more tasks of the number of tasks.

13. The method of claim 1, further comprising:
collecting historical data associated with a completion of a ticket;
storing the historical data;
generating the estimated time to completion for a ticket based on the historical data; and
evaluating a performance of an agent based on an actual time to completion for a plurality of tickets completed by the agent and the estimated time to completion for the plurality of tickets completed by the agent.

14. A system including a non-transitory computer readable medium including code segments that when executed by a processor cause the processor to:
receive a ticket indicating a problem;
generate an auction for the ticket;
generate a plurality of messages based on the auction;
communicate the plurality of messages to a plurality of agents as participants in the auction, the plurality of messages being communicated via at least one of a wired and wireless communications network;
receive at least two responses to resolve the problem from at least two agents, the at least two responses including one of a bid, a hold and a no bid, the bid including a time to resolution;
determine that there is a conflict between two or more bids;
upon determining there is a conflict between the two or more bids:
resolve the conflict between the two or more bids based on a coefficient of deviation for each of the agents, wherein the coefficient of deviation is calculated based on an estimated time for resolution for at least one completed ticket and an actual completion time for the at least one completed ticket; and
allocate the ticket to one of the plurality of agents based on the resolved conflict, including automatically sending an electronic notification assigning the ticket to the one of the plurality of agents, the ticket including the time to resolution,
wherein the coefficient of deviation for an agent who responded is calculated using:

$$DNC_n = (N_{dt}/N_{ct})\times(SDT_{n_t}/SET_{n_t})\times[SDF_{(N-1)(T-1)}SDF_{(N-1)(T-1)}+DF_{n_t}]$$

wherein:
DNC is the coefficient of deviation,
$N_{dt}$ is a total number of deviated tickets at time t,
$N_{ct}$ is a total number of completed tickets at time t,
SDT is a sum of a deviation time for all completed tickets of the agent in minutes,
$SET_t$ is a sum of an estimated time to resolution for all completed tickets of the agent in minutes,
SDF is a sum of a deviation factor for all completed tickets of the agent, and
DF is a deviation factor for each completed ticket of the agent,
and further wherein the system includes a learning module configured to execute an iterative computer operation that performs self-learning over multiple iterations of auctions for tickets and corresponding ticket resolutions, to track and optimize a discontinuity value, the discontinuity value being used by the auction server to adjust the time to resolution based on the multiple iterations.

15. The system of claim 14, wherein generating an auction includes:
determine a group based on the problem; and
broadcast the ticket to the group.

16. The system of claim 14, wherein allotting the ticket includes:

fetching the time to resolution for each of the bids;
determining an auction winner based on a lowest time to resolution;
allotting the ticket to the auction winner; and
notifying the auction winner that the auction winner has been allotted the ticket.

17. The system of claim 14, wherein the code segments further cause the processor to:
fetch the time to resolution for each of the bids;
determine if the time to resolution for two or more of the bids are within a range of each other; and
if the time to resolution for two or more of the bids are within a range of each other, allot the ticket based on a historical performance of the agents with the bids within a range of each other.

18. The system of claim 14, wherein the code segments further cause the processor to:
fetch the time to resolution for each of the bids;
determine if the time to resolution for two or more of the bids are within a range of each other;
determine a priority coefficient based on severity and impact of tasks for each of the agents with the bids within a range of each other; and
if the time to resolution for two or more of the bids are within a range of each other, allot the ticket based on a historical performance of the agents with the bids within a range of each other, wherein the historical performance is scaled based on the priority coefficient.

19. The system of claim 14, wherein the code segments further cause the processor to:
fetch the time to resolution for each of the bids;
determine if the time to resolution for two or more of the bids are within a range of each other; and
if the time to resolution for two or more of the bids are within a range of each other, allot the ticket based on the coefficient of deviation associated with the agents with the bids within a range of each other.

20. The system of claim 14, wherein the code segments further cause the processor to:
determine if an incident associated with the problem is a candidate for collaboration; and
if the incident is a candidate for collaboration:
generate two or more tickets for the incident based on a number of tasks associated with resolving the incident; and
generate an auction for each of the two or more tickets.

* * * * *

UNITED STATES PATENT AND TRADEMARK OFFICE
CERTIFICATE OF CORRECTION

PATENT NO. : 10,796,361 B2
APPLICATION NO. : 13/930466
DATED : October 6, 2020
INVENTOR(S) : Puthiyottil et al.

Page 1 of 1

It is certified that error appears in the above-identified patent and that said Letters Patent is hereby corrected as shown below:

On the Title Page

On Page 2, Column 1, item (56), under "OTHER PUBLICATIONS", Line 1, delete "al," and insert -- al., --, therefor.

In the Claims

In Column 23, Claim 1, Line 62, delete "comprising" and insert -- comprising: --, therefor.

Signed and Sealed this
Twelfth Day of January, 2021

Andrei Iancu
*Director of the United States Patent and Trademark Office*